Figure 1:
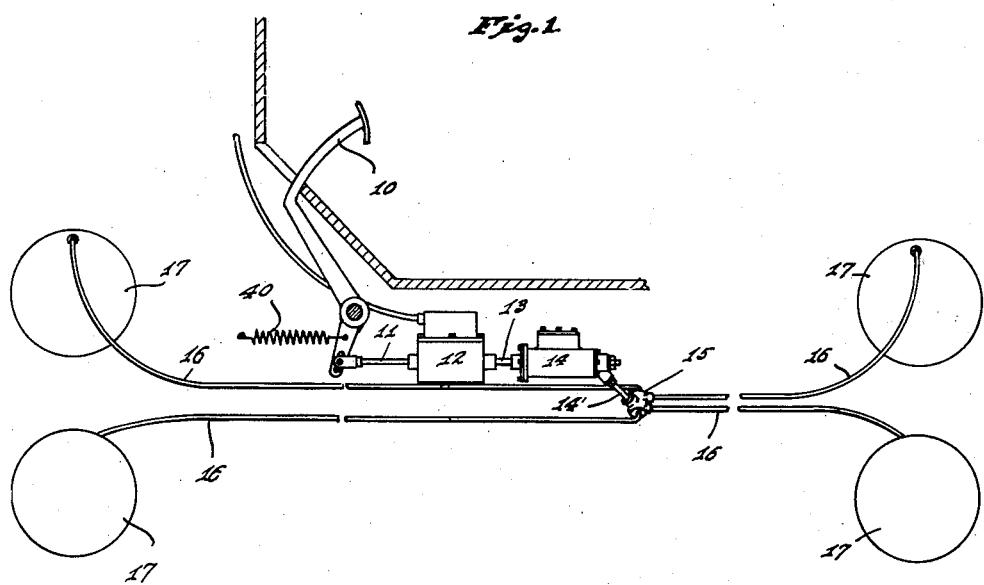

Jan. 30, 1945.  C. A. BAUER  2,368,103
HYDRAULIC BRAKE
Filed April 29, 1943

INVENTOR.
CHARLES A. BAUER,
BY
ATTORNEYS.

Patented Jan. 30, 1945

2,368,103

UNITED STATES PATENT OFFICE 2,368,103

HYDRAULIC BRAKE

Charles A. Bauer, Newburg, Ind.

Application April 29, 1943, Serial No. 484,986

4 Claims. (Cl. 60—54.5)

My invention relates to hydraulic braking systems of the type commonly used at present in automobiles. Such systems comprise a master cylinder provided with a pedal-operated piston by movement of which liquid is displaced from the master cylinder to the shoe-actuating cylinders of the individual brakes.

Before effective braking effort can be exerted in the operation of such a braking system, it is necessary to displace from the master cylinder by operation of the pedal a certain initial amount of liquid in order to take up mechanical clearances and compensate for compression of the brake linings and expansion of the conduits through which liquid is conveyed from the master cylinder to the individual brake cylinders. In practice, this fact places a limitation upon the maximum force which the brake cylinders can exert on the brake shoes.

The force applied to the brake pedal is limited by the strength of the operator. If an attempt is made to increase the mechanical advantage of the system, as by increasing the size of the brake cylinders, by reducing the size of the master cylinder, or by altering the proportions of the pedal which moves the piston in the master cylinder, a concomitant effect is an increase in the amount of pedal-travel necessary to displace from the master cylinder the initial quantity of liquid which must be displaced therefrom before any effective braking occurs. Since the total range of pedal-movement is limited in practice, increasing the mechanical advantage of the system may reduce below a practical minimum the amount of possible pedal-movement remaining after the initial quantity of liquid has been displaced from the master cylinder. An increase in actual braking effort can be obtained by increasing the self-energizing properties of the individual brakes; but on this step there is a practical limit beyond which the brakes become difficult to control and ineffective to prevent reverse movement of the vehicle. All these factors handicap the designer of a braking system, with the result that braking systems in common use represent compromises which still leave something to be desired.

It is the object of my invention to remove from the designing of hydraulic braking system some or all of the limitations mentioned above. More specifically, it is my object to provide a braking system in which the actual effort applied to the braking shoes may be as great as is desired without increasing the force which must be exerted on the brake pedal and without increasing the complete amount of pedal-travel necessary to apply the brakes.

In carrying out my invention I employ between the master cylinder and the brake cylinders of a hydraulic braking system a pressure-booster which serves, when the pressure in the master cylinder has attained a predetermined value, to increase the effective mechanical advantage of the system. This pressure-booster, in the preferred arrangement comprises a floating double-ended piston one end of which operates in a low-pressure cylinder of relatively large area, and the other end of which operates in a high-pressure cylinder of relatively small area. The low-pressure cylinder is in communication with the master cylinder of the braking system, while the high-pressure cylinder is in communication with the several brake-cylinders. Movement of the piston under the influence of pressure in the low-pressure cylinder is opposed by a spring having a strength such as will prevent piston-movement until the pressure in the low-pressure cylinder reaches the predetermined value at which the mechanical advantage of the system is to be increased. The booster includes a passage which affords communication between the low-pressure and high-pressure cylinders of the booster when the piston is held in its normal position by the spring; but a valve is provided which automatically closes such passage when the pressure in the low-pressure cylinder becomes sufficient to move the piston against the action of the spring. Because of this interruption of communication between the low-pressure and high-pressure cylinders, further movement of the piston displaces liquid at high pressure from the high-pressure cylinder to the brake cylinders.

The accompanying drawing illustrates my invention: Fig. 1 is a somewhat diagrammatic view illustrating a braking system embodying my invention and suitable for use in a vehicle having four braked wheels; and Fig. 2 is a longitudinal section through the pressure-booster.

In the arrangement illustrated in the drawing, a pedal 10 is operatively connected through a piston rod 11 with a piston in a master cylinder 12. The cylinder 12 is connected by a conduit 13 with the pressure-booster 14, and the latter is in turn connected through a conduit 14', a suitable branch fitting 15, and conduits 16 with the brake cylinders (not shown) of four brakes 17 respectively associated, as will be understood, with the four wheels of the vehicle in which the braking system is installed.

Figure 2:
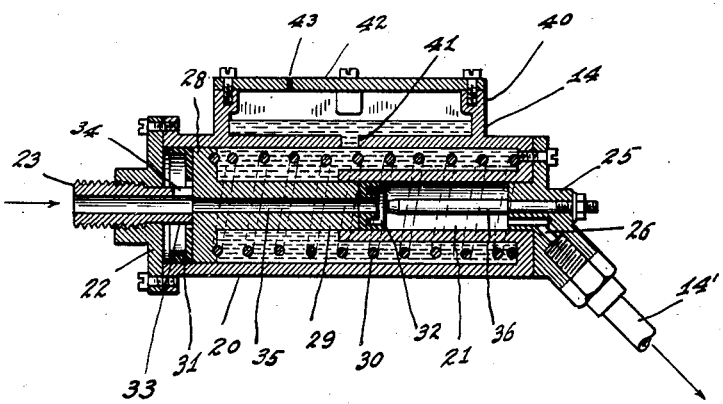

As will be apparent from Fig. 2, the pressure-booster 14 comprises a low-pressure cylinder 20 of relatively large cross-sectional area and a high-pressure cylinder 21 of relatively small cross-sectional area. These cylinders are desirably co-axial, with the high-pressure cylinder 21 being formed as an axially elongated flange extending inwardly from the closed end of the low-pressure cylinder 20.

The open end of the low-pressure cylinder 20 is closed with a removable head 22 in which is mounted a nipple 23 adapted for connection to the conduit 13 leading from the master cylinder 12. The opposite end of the high-pressure cylinder 21 is closed with a head 25 through which there extends a passage 26 providing communication between the cylinder 21 and the conduit 14′.

A piston 28, which fits within the low-pressure cylinder 20, has a shank 29 which extends into and fits the high-pressure cylinder 21. Operating between the piston 28 and the closed end of the cylinder 20 is a spring 30 which urges the piston toward the head 22. On that face directed toward the head 22, the piston 28 is provided with a sealing cup 31 of some suitable resilient material, while a similar cup 32 is located at the end of the shank 29 within the high-pressure cylinder 21. Movement of the piston toward the cylinder-head 22 under the influence of the spring 30 is conveniently limited by extending the nipple 23 into the cylinder 20, as illustrated at 33, so that the piston 28 will engage the inner end of such nipple before the sealing cup engages the head.

The inwardly projecting end 33 of the nipple 23 is laterally ported, as indicated at 34, to provide communication of the master cylinder 12 with the space in the low-pressure cylinder 20 between the piston 28 and the head 22 even when the piston lies against the end of the nipple. Extending axially through the piston 28 and its shank 29 is a passage 35, which normally provides communication between the low pressure cylinder 20 and the high-pressure cylinder 21. This passage is desirably concentric with the cylinders and piston; and in alignment with it and supported from the head 25 I provide a valve member 36 adapted to enter the passage 35 and close it when the piston is moved to the right from the position illustrated in Fig. 2. The sealing cup 32 is desirably provided with both an external flange operating in contact with the wall of the cylinder 21 and with internal flange operating against the exterior surface of the valve member 36.

With the brake pedal 10 elevated, as indicated in Fig. 1, there will be no substantial pressure in the master cylinder 12, the piston 28 of the pressure-booster 14 will occupy a position at the leftward limit of its movement as indicated in Fig. 2, and the brakes 17 will all be released. To apply the brakes, the pedal 10 is depressed, thus displacing liquid from the master cylinder. Since the latter is in open communication with the brake-cylinders, depression of the pedal 10 causes the brake-shoes to expand, in known manner, into engagement with the respectively associated brake drums. The pressure in the entire system is communicated to the cylinder 20 at the left of the piston 28 through the port 34 and thus tends to move the piston 28 to the right, but such movement is opposed by the spring. So long as the braking effort desired does not involve the creation in the low-pressure cylinder 20 of a pressure great enough to overcome the force exerted on the piston 28 by the spring 30, the braking system therefore operates in conventional manner. However, if the operator in increasing the braking effort, depresses the pedal 10 far enough to raise the pressure in the cylinder 20 sufficiently to overcome the spring 30, the piston 28 will be moved to the right. As the piston moves to the right, the valve member 36 enters the passage 30, prevents the further transmission of liquid into the high-pressure cylinder 21, and thus increases the over-all mechanical advantage of the system by the ratio of the area of the cylinder 20 to the area of the cylinder 21.

Upon the release of pressure from the pedal 10, it will be restored to its normal position, as by means of the conventional spring 40. Return of the pedal to normal position will retract the piston in the master cylinder 12, relieve pressure in the low-pressure cylinder 21 of the booster 14, and permit the spring 30 to restore the piston 28 to the normal position illustrated in Fig. 2. This movement of the piston 28 opens the passage 35, and thus permits return of fluid from the several brake cylinders.

It is to be noted that in the normal condition of the system—i. e., when the pedal 10 is elevated and the brakes fully released—all liquid-containing portions of the system are in free communication with each other. This makes it possible to maintain the proper quantity of liquid in the system by any of the expedients commonly employed for that purpose. Further, since the booster 14 requires no operative mechanical connection with any portion of the system, it may, if desired, be readily installed in any braking system now in use.

If the valve member 36 operated to affect a sudden closing of the passage 35, the increase in mechanical advantage provided by the booster 14 would occur abruptly. This might create an equally abrupt and substantial increase in braking effort, which would make braking very difficult to control. To prevent this, the front end of the valve member 36 may be tapered or otherwise made of gradually increasing area from front to rear, so that the closing of the passage 35, instead of occurring abruptly, will occur gradually as the piston 28 moves rearwardly against the force exerted upon it by the spring 30. Until the tapered portion of the valve member 36 has completely entered the passage 35, there will be some flow of liquid through that passage; but the opening through which such liquid passes will be gradually reduced in area, with the result that the differential in fluid-pressure between the cylinder 28 and the cylinder 21 will gradually increase as the piston 28 moves rearwardly until it attains the proportionate value represented by the ratio of the respective cylinder areas.

Movement of the piston 28 from its normal position requires venting of the space behind it in the cylinder 20. To prevent the introduction of dust and dirt into the cylinder 20 as the result of such venting, I may provide above the cylinder a liquid reservoir 40, which communicates through an opening 41 with that portion of the cylinder 20 lying in rear of the piston 28. The chamber 40 is provided with a removable cover 42 having a relatively small vent opening 43. By completely filling the rear portion of the cylinder 20 and partially filling the chamber 40 with a suitable liquid such as oil, direct communication between the cylinder 40 and the atmosphere is prevented. When the piston 28 is moved to the right, the liquid displaced from the space behind it is elevated into the chamber 40 through the opening 41, displacing from the upper portion of such chamber air which escapes through the vent 43. Upon release of the brake pedal and restoration of the piston 28 to its normal position by the action of the spring 30, liquid is returned to the cylinder 20 by suction and gravity through the opening 41, thus causing air to be introduced into the upper portion of the chamber 40 through the opening 43. The greater portion if not all of any dust or dirt entering through the opening 43 will be trapped by the body of liquid remaining in the chamber 40, and will thus be prevented from entering the cylinder 20.

I claim as my invention:

1. In a hydraulic braking apparatus including a master cylinder and one or more hydraulic brake motors, a pressure booster comprising a pair of co-axial cylinders of different cross-sectional areas and a floating element having portions respectively fitting said cylinders, conduits connecting the larger of said booster cylinders to said master cylinder and the smaller to said brake motors, said floating element being provided with an axially extending passage affording communication between said two booster cylinders, a spring acting on said floating element and opposing its movement under the influence of liquid displaced from said master cylinder, and an axially extending valve member disposed centrally in the smaller cylinder in position to enter and close the passage through said floating element after the latter has moved a predetermined distance against the force exerted on it by said spring, the end of said valve member being tapered whereby the closing of said passage is effected gradually.

2. In a hydraulic braking apparatus including a master cylinder and one or more hydraulic brake motors, a pressure booster comprising a pair of co-axial cylinders of different cross-sectional areas and a floating element having portions respectively fitting said cylinders, conduit connecting the larger of said booster cylinders to said master cylinder and the smaller to said brake motors, said floating element being provided with an axially extending passage affording communication between said two booster cylinders, a spring acting on said floating element and opposing its movement under the influence of liquid displaced from said master cylinder, and an axially extending valve member disposed centrally in the smaller cylinder in position to enter and close the passage through said floating element after the latter has moved a predetermined distance against the force exerted on it by said spring.

3. A pressure booster for connection between the master cylinder and brake motor of a hydraulic braking system, comprising a pair of co-axial cylinders of different cross-sectional areas, the larger of said booster cylinders being adapted for connection to said master cylinder and the smaller to said motor, a floating element having portions respectively fitting said booster cylinders, yielding means biasing said movable element in a direction to expel fluid from the larger booster cylinder, said floating element being provided with an axially extending passage affording communication between said two booster cylinders, and an axially extending valve member disposed centrally in the smaller cylinder in position to enter and close the passage through said floating element after the latter has moved a predetermined distance against the force exerted on it by said yielding means, the end of said valve member being tapered whereby the closing of said passage is effected gradually.

4. A pressure booster for connection between the master cylinder and brake motor of a hydraulic braking system, comprising a pair of co-axial cylinders of different cross-sectional areas, the larger of said booster cylinders being adapted for connection to said master cylinder and the smaller to said motor, a floating element having portions respectively fitting said booster cylinders, yielding means biasing said movable element in a direction to expel fluid from the larger booster cylinder, said floating element being provided with an axially extending passage affording communication between said two booster cylinders, and an axially extending valve member disposed centrally in the smaller cylinder in position to enter and close the passage through said floating element after the latter has moved a predetermined distance against the force exerted on it by said yielding means.

CHARLES A. BAUER.